Patented July 28, 1953

2,647,108

UNITED STATES PATENT OFFICE 2,647,108

PRODUCTION OF POLYTHIOUREAS

David J. Waters and Donald L. Wilson, Coventry, England, assignors to Courtaulds Limited, London, England, a British company No Drawing. Application October 29, 1951, Serial No. 253,760. In Great Britain November 21, 1950

4 Claims. (Cl. 260—79)

This invention relates to the production of polythioureas.

Polythioureas are already known. For example, United States patent specification No. 2,313,871 describes a process for the manufacture of polythioureas which comprises heating substantially in stoichiometric proportions a mixture of one or more diamines and a thiourea-forming derivative of thiocarbonic acid, for example carbon disulphide. British patent specification No. 524,795 describes a process for making condensation products by reacting an anhydride of a thiocarbonic acid, for example carbon disulphide, with an aliphatic diamine, the amino groups of which are separated by a chain of at least three carbon atoms; the resulting product may then be heated to give a thermoplastic substance which is capable of being drawn out into threads or the like articles. United States patent specification No. 2,566,717 describes an improved process for the production of polythioureas by reacting carbon disulphide with a diamine, the amino groups of which are separated by a chain containing at least three carbon atoms, to form an intermediate salt and then heating this salt until a fibre-forming thermoplastic polythiourea is obtained, wherein the carbon disulphide is reacted with the diamine in the form of an aqueous emulsion containing a wetting agent. It is disclosed in both British specification No. 524,795 and United States specification No. 2,566,717 that the heating of the intermediate salt to form the fibre-forming polythiourea is preferably effected by heating the salt in the form of a paste in the presence of water or steam.

In general, for the production of polythioureas of the requisite high molecular weight for fibre production, it is desirable to use starting materials of high purity but the purifications involved add to the cost of the process.

It is the object of the present invention to produce improved fibre-forming polythioureas without the need for using materials of high purity.

According to the present invention, in a process for the production of polythioureas by reacting carbon disulphide with a diamine, the amine groups of which are separated by a chain containing at least three carbon atoms, to form an intermediate salt and heating this salt in the presence of water or steam until a fibre-forming thermoplastic polythiourea is obtained, the heating of the intermediate salt is effected in two or more stages and all or a substantial part of the aqueous liquor associated with the polymer is removed between successive heating stages. The aqueous liquor is preferably replaced by water before the heating is resumed. The heating is preferably effected under pressure, for example in an autoclave at pressures of the order of 30 to 110 pounds per square inch and preferably with a current of steam passing through the autoclave to remove gases evolved during the polymerisation.

When the salt is initially heated in an autoclave, all or most of the salt dissolves in the hot water and during the further heating a polymeric product is precipitated. In a preferred form of the invention, the heating stages are so selected that a substantial polymerisation has taken place during the first heating stage, that is to say that from 70 per cent to 95 per cent of the theoretical yield of the polymer has been precipitated. When the polymerisation reaction has proceeded to such an extent the aqueous liquor should be removed and preferably replaced by fresh water; the time at which this point is reached may be determined by previous experiment or by carrying out tests during the heating operation on samples of the polymer and/or the aqueous phase and/or the exhaust gases. The second heating step is preferably effected at a higher temperature than that used in the first step; for example the first stage may conveniently be effected at 20 to 40 pounds per square inch steam pressure and the second stage at 80 to 110 pounds per square inch steam pressure.

Polythioureas obtained by the process according to the invention are generally found to have higher intrinsic viscosities and improved fibre-forming properties as compared with polythioureas obtained by a single, uninterrupted heating operation using starting materials of the same purity. It is believed that the aqueous liquid separated between the heating stages removes low molecular weight polymers, monofunctional compounds which tend to limit the degree of polymerisation and other undesirable impurities either originally present or formed e. g. by oxidation during the preparation of the polythioureas.

The invention is illustrated by the following examples in which parts referred to are by weight:

*Example 1*

100 parts of hexamethylene diamine (technical grade) and 0.65 part of triethanolamine were dissolved in 1750 parts of water. The solution was stirred mechanically at 20° to 25° centigrade while 70 parts of carbon disulphide (commercial grade) containing 1.25 parts of oleic acid were run in over a period of 12 minutes. Stirring was continued for a further hour and the mixture allowed to stand for 1½ hours. The product was filtered, washed with water three times and stirred with water to give a paste containing 8.1 per cent by weight total solids.

44.6 kg. of this paste were transferred to a stainless steel vessel having a lid. The vessel and its contents were placed in an autoclave with a current of steam passing through it and heated for 30 minutes at 0 to 5 pounds per square inch steam pressure to bring the paste to a temperature approaching reaction temperature. The steam pressure was then raised to 30 pounds per square inch and after a time hydrogen sulphide was detected in the steam exhaust, indicating that reaction was taking place. After 3 hours heating at this steam pressure, a valve connected to a dip pipe in the reaction vessel was opened so that the pressure in the autoclave blew most of the aqueous liquor out of the vessel. This operation took 15 minutes and during this time the steam pressure was maintained at 30 pounds per square inch. The external connections were then changed and hot water was blown into the vessel under steam pressure. This operation took 95 minutes at the end of which time the steam pressure had risen to 55 pounds per square inch. The steam pressure was raised to 100 pounds per square inch and kept at this value for 9 hours. The steam was turned off and the autoclave allowed to cool. The polymer which had formed a cake on the bottom of the vessel, was removed, broken up and dried. The weight of the product was 2.25 kg., 73 per cent of the theoretical yield.

The intrinsic viscosity of the product in a 1 per cent metacresol solution was 0.61, intrinsic viscosity ($\eta_i$) being defined as $$\eta_i = \frac{\log_e \frac{\text{viscosity of solution}}{\text{viscosity of solvent}}}{c}$$

where $c$ is the concentration of the solution in grams per 100 ml.

A further sample of polymer made from a similar paste of intermediate salt by subjecting it to an uninterrupted heating operation had an intrinsic viscosity of 0.37.

*Example 2*

400 grams of a paste containing 9.43 per cent by weight total solids, prepared as described in Example 1, were placed in a stainless steel vessel having a lid and a dip pipe fitted so that liquid could be blown off when desired. The vessel and contents were heated in an autoclave for 5 minutes by steam at atmospheric pressure in order to bring the paste near to reaction temperature and heating was then continued for 40 minutes at 30 pounds per square inch pressure. Most of the liquid was then blown out of the vessel; the liquid removed contained 27 per cent of the original concentration of salt thus indicating, by difference, that 73 per cent of the theoretical yield of polymer had been precipitated. Water was added to the vessel to replace the liquid removed and heating was continued for 1 hour at 100 pounds per square inch steam pressure.

The product obtained had an intrinsic viscosity, measured as described in Example 1, of 0.61.

In a further polymerisation run using a two-stage heating with the same paste, the conditions were as set out above except that stage 1 consisted in heating for 20 minutes at 30 pounds per square inch steam pressure. The liquid then removed contained 53 per cent of the original concentration of salt. The intrinsic viscosity of the product was 0.50.

When a sample of the same paste was subjected to a corresponding, but uninterrupted, heating operation, the product had an intrinsic viscosity of 0.47.

What we claim is:

1. A process for the production of polythioureas by reacting carbon disulphide with a primary diamine, the amino groups of which are separated by a chain containing at least three carbon atoms, to form an intermediate salt and heating this salt, comprising heating the salt in the presence of an aqueous medium until from 70 per cent to 95 per cent of the theoretical yield of a thermoplastic polythiourea has been precipitated, removing most of the aqueous liquor associated with the polymer and then heating the polymer, still in the presence of an aqueous medium until a fibre-forming thermoplastic polythiourea is obtained.

2. A process as claimed in claim 1 wherein the second heating stage is effected at a higher temperature than that used in the first heating stage.

3. A process as claimed in claim 1 wherein the aqueous liquid removed is replaced by water before the second heating stage is begun.

4. A process for the production of polythioureas by reacting carbon disulphide with a primary diamine, the amino groups of which are separated by a chain containing at least three carbon atoms, to form an intermediate salt and heating this salt, comprising heating the salt in the presence of an aqueous medium at 20 to 40 pounds per square inch steam pressure until from 70 per cent to 95 per cent of the theoretical yield of a thermoplastic polythiourea has been precipitated, removing most of the aqueous liquor associated with the polymer and then heating the polymer still in the presence of an aqueous medium at 80 to 110 pounds per square inch steam pressure until a fibre-forming thermoplastic polythiourea is obtained.

D. J. WATERS.
DONALD L. WILSON.

References Cited in the file of this patent

UNITED STATES PATENTS

| Number | Name | Date |
|---|---|---|
| 2,566,717 | Carpenter | Sept. 4, 1951 |

FOREIGN PATENTS

| Number | Country | Date |
|---|---|---|
| 524,795 | Great Britain | Aug. 14, 1940 |